S. F. MILLER.
ADJUSTABLE VENT FOR SIPHONS.
APPLICATION FILED AUG. 26, 1909.
1,037,791.
Patented Sept. 3, 1912.
2 SHEETS—SHEET 1.
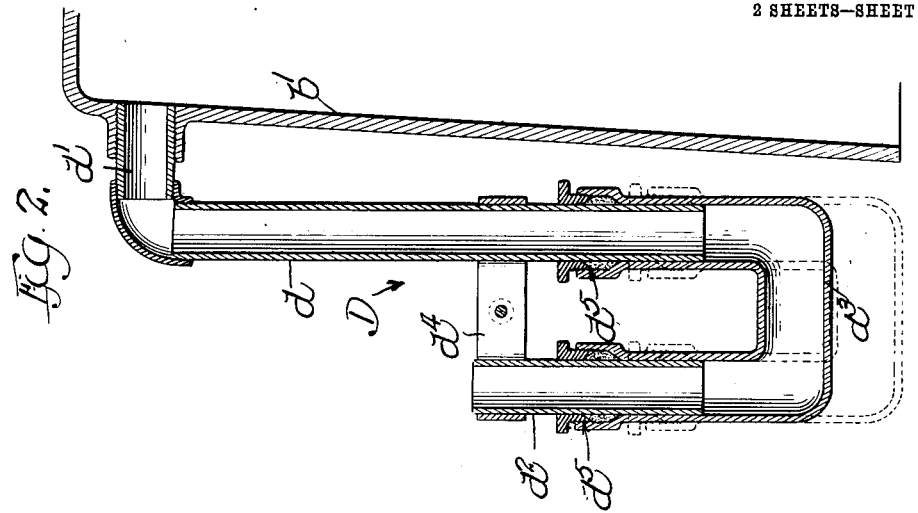
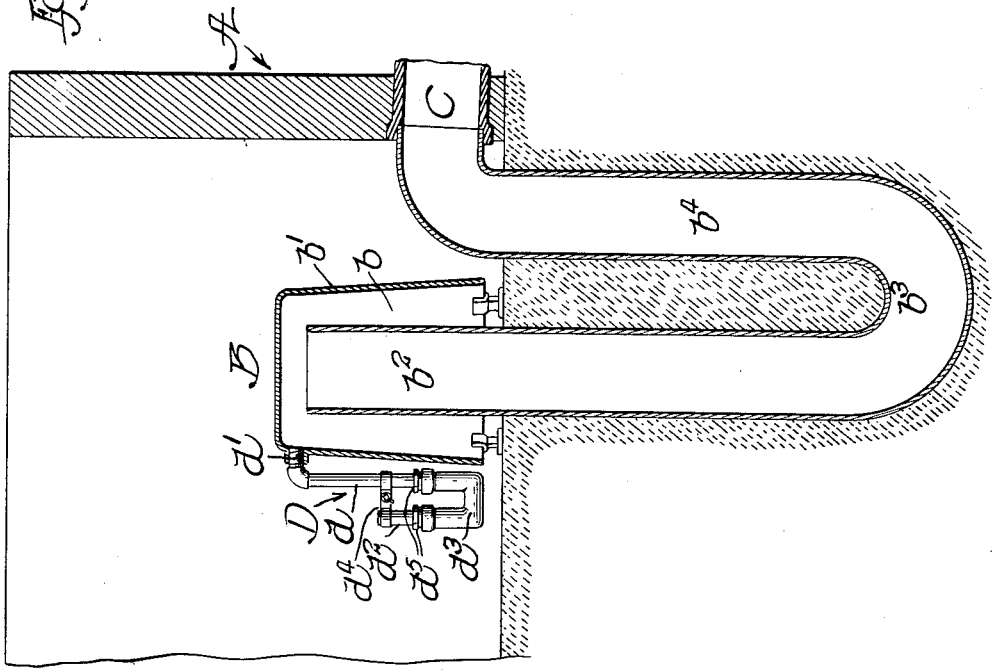
Witnesses:
Inventor
Samuel F. Miller
by Poole & Brown
Attys

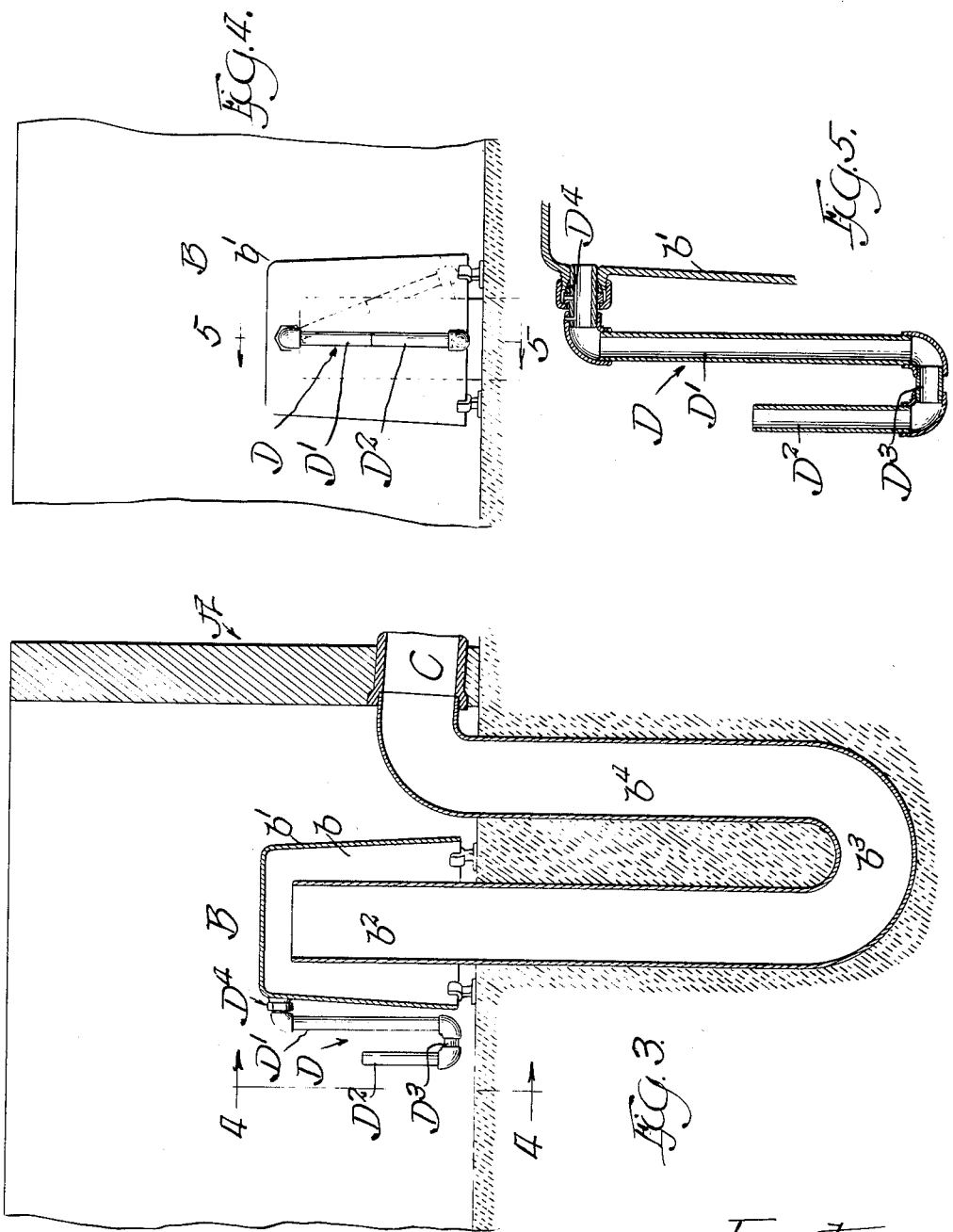

UNITED STATES PATENT OFFICE.

SAMUEL F. MILLER, OF SOUTH ORANGE, NEW JERSEY, ASSIGNOR TO PACIFIC FLUSH TANK COMPANY, OF CHICAGO, ILLINOIS, A CORPORATION OF ILLINOIS.

ADJUSTABLE VENT FOR SIPHONS.

1,037,791.  Specification of Letters Patent.  Patented Sept. 3, 1912.

Application filed August 26, 1909. Serial No. 514,717.

*To all whom it may concern:*

Be it known that I, SAMUEL F. MILLER, a citizen of the United States, and a resident of South Orange, in the county of Essex and State of New Jersey, have invented certain new and useful Improvements in Adjustable Vents for Siphons; and I do hereby declare that the following is a full, clear, and exact description thereof, reference being had to the accompanying drawings, and to the letters of reference marked thereon, which form a part of this specification.

This invention relates to improvements in automatic siphons designed to automatically empty the liquid contents of a tank or receptacle and particularly to a novel venting device for venting siphons of this character, which is so constructed as to make it possible to adjust the level of the liquid in the tank at which the siphon is vented, that is to say, the level at which air is admitted to the siphon in order to restore the balance and stop siphonic action, to various depths below the fixed level at which air compression in the siphon is started in order to discharge the liquid contents of the vessel through the siphon.

The invention consists in the matters hereinafter set forth and more particularly pointed out in the appended claims.

In the drawings:—Figure 1 is a vertical sectional view of a siphon provided with my improved vent, showing a fragment of the tank which is emptied by the siphon, to illustrate the relation of the siphon thereto. Fig. 2 is a detail, sectional view on an enlarged scale of the improved vent and of a fragment of the bell to which it is attached. Fig. 3 is a vertical sectional view similar to Fig. 1, showing a modification of my improved vent. Fig. 4 is a vertical section through Fig. 3 on line 4—4 thereof. Fig. 5 is a detail sectional view on an enlarged scale on the line 5—5 of Fig. 4, showing the manner of attaching the modified form of vent to the side of the bell.

Referring first to the form of construction shown in Figs. 1 and 2, A indicates a tank which is filled from any suitable source of liquid supply, and B indicates a deep seal, trapped siphon, through the medium of which said tank is to be emptied. Said siphon is of the usual form, with its shorter leg $b$ formed by a downwardly opening bell $b^1$ inverted over the upper end of the upwardly extending leg $b^2$ of a sealed trap $b^3$. The trap $b^3$ has an outlet $b^4$ which is shorter than the leg $b^2$, and discharges into a pipe or conduit C, which, as shown herein, has its bottom slightly above the level of the bottom wall of the tank, and through which the liquid discharged by the siphon is conveyed to any suitable place of disposal.

As far as described the construction shown is of a well known type and forms no part of my invention.

D indicates as a whole my improved venting device which is adapted both to effect the sealing of the bell for starting the siphonic action and to admit air into the bell to cause the siphonic action to cease when the water in the tank A has reached a predetermined level. It has, in general, the form of a pipe or tube of U-form comprising a longer leg $d$ which is connected at its upper end with the interior of the bell at the top of the latter, and a shorter leg $d^2$ connected with the first named leg at its lower end by means of a U-shaped connecting pipe $d^3$. The leg $d$ as shown in the drawings is provided at its upper end with a thread $d^1$ by means of which it is connected to the wall of the bell. The height of the open upper end of the shorter leg $d^2$ of the venting device above the bottom of the tank A determines the water level in the bell $b^1$ when the same is sealed, that is to say, closed against the further escape of air therefrom, since it is apparent that the level of the liquid in the bell $b^1$ will rise equally with the level of the liquid in the tank until the escape of air from the bell is cut off by water flowing into the said shorter leg $d^2$ of the venting device. Said level at which the bell is sealed is fixed and maintained constant in this case by rigidly securing the leg $d^2$ to the leg $d$ in any convenient manner as, for example, by means of a strap or bracket $d^4$. The level of the liquid in the tank A at which the venting of the siphon occurs, that is to say, the level at which air from the tank A will enter the bell $b^1$ and break the siphon, is determined, as will appear later, by the level of the cross member of the U-shaped pipe $d^3$. A principal object of the invention is to make this last named level capable of adjustment and to this end, in the construction illustrated in Figs. 1 and 2, the venting device D embraces the two vertically arranged pipes $d$, $d^2$, arranged in telescopic connection with the ends of the U-shaped pipe $d^3$.

$d^5$, $d^5$ indicate stuffing boxes to make an air-tight connection between the pipes $d$, $d^2$, and the connecting U-shaped pipe $d^3$.

The operation of the improved venting device is as follows: As the liquid flows into the tank A, the level of the liquid rises in said tank and also within the bell $b^1$, the air in top of the bell escaping through the venting device D, which, at this time, contains no water. As soon as the level of the liquid reaches the top of the leg $d^2$ of the venting device the liquid flows into said leg and seals the venting device so as to prevent the further escape of air from the bell $b^1$ which thus becomes sealed. The level of the liquid in the tank A then continues to rise until it reaches a predetermined fixed level at which the pressure of the air within the bell, under the head of water in the tank, becomes such as to break the water seal in the trap $b^3$, whereupon the discharge of the liquid from the tank through said trap begins under the pressure due to the head and so continues until the level of the liquid in the tank A falls to a level below the upper end of the pipe $b^2$, constituting the longer leg of the siphon when siphonic action begins. Inasmuch as the atmospheric pressure by which the liquid in the tank and in the venting device is drawn into the bell by the siphonic action is the same per square inch on the top of the liquid in the pipe $b^2$ as upon the top of the liquid in the tank, it follows that the level of the liquid within the said pipe $b^2$ will fall with the level of the liquid in the tank. This siphonic action continues as the water level in the tank A falls until the level of the liquid in the short leg $d^2$ of the venting device, reaches the level of the cross-member of the U-shaped pipe $d^3$, when the seal therein is broken and air, drawn by the partial vacuum existing in the top of the bell by reason of the operation of the siphon, passes up through the leg $d$ of the venting device, and entering the top of the bell equalizes the pressure in the bell and tank (it being understood of course that the water in said leg $d$ is drawn up into said bell in advance of the air). This breaks the siphon and stops the discharge of liquid from the tank. From this description of the operation it is apparent that the level of the liquid in the tank at which the siphon will be broken by admitting air to the top of the bell, may be varied by adjusting the U-shaped pipe $d^3$ up or down.

Various advantages result from the use of my improved adjustable vent providing means for determining the sealing level of the siphon and also for adjustably determining what may be termed the low head of the siphon, that is to say, the level of the liquid in the tank when the siphon is broken. In the emptying of a tank which is filled from filter beds, for example, where it is required that the siphon shall thoroughly drain the tank, the bottom of the discharge pipe C is located at or near the bottom of the tank, as shown in the drawings, in order to diminish the force of the siphon as it nears the end of its period of operation and thus retard the rate of its discharge as the level of the liquid approaches the bottom of the tank. In the use of siphons of the kind described, as heretofore constructed, the level at which siphonic action ceased was determined by the bottom of the bell which was set as nearly as possible so as to locate its bottom near the bottom level of the discharge pipe. It is very difficult, however, in the case of siphons of the character described, to properly adjust the mouth of the bell with reference to the level of the bottom of the discharge pipe and, when once set, it is difficult and practically impossible to change this level, especially in large siphons where the bells run from 8 to 12 inches in diameter. By the use of the new vent described, the bell may be set with its lower edge below the lower level of the discharge pipe, since it is not necessary, in order to stop siphonic action, for the level of the water in the tank to fall below the bottom of the bell, which, of course, it can not do when the bottom of the bell is below the level of the bottom of the discharge pipe. The venting device can then be adjusted so as to insure the venting of the main siphon when the level of the liquid in the tank is as nearly above the bottom of the discharge pipe as desired. Nice setting of the bell is not only thus rendered unnecessary, but the low level of the siphon may be adjusted at any time to suit the conditions under which the siphon is operating.

In Figs. 3, 4 and 5 is shown a modified form of my improved vent. In said views the vent D is shown as pivotally secured to the wall of the bell near its top, pivotal connection being made in any suitable manner, with a suitable stuffing box being provided to make a tight joint. In said figures, $D^1$ indicates the long leg of the vent; $D^2$ the short leg; $D^3$ the transverse connecting pipe connecting said legs at the bottom, and $D^4$ the pivotal connection of the vent to the upper part of the side wall of the bell $b^1$. The level of the transverse connecting pipe $D^3$ may be adjusted by swinging the vent, as a whole, upon its pivotal connection $D^4$ with the bell, as indicated in dotted lines in Fig. 4. The upper end of the short leg $D^2$ of the vent, being closer to the pivotal point than the bend connecting said legs, its level, that is to say, the level at which the siphon will be sealed, will remain substantially fixed for various adjustments of the level of the bend by swinging the vent D on its pivotal connection with the bell, within the usual limits of adjustment of the bend required.

The details of construction by means of which the vent described may be made adjustable so as to adjust the level of the low head of the siphon may be modified in various ways without departing from the spirit of the invention and I do not wish to be limited to the details of construction and arrangement illustrated and described herein except as pointed out in the appended claims.

I claim as my invention:—

1. In a siphon, in combination with the longer and the shorter leg thereof, of a vent adapted for determining both the sealing level and low head of the siphon embracing a U-shaped pipe having substantially upright legs, one of which is longer than the other, means connecting the longer leg of the vent with the interior of the siphon, the upper end of the shorter leg of the vent being located substantially at the sealing level of the siphon, and means for adjusting the level of the bend of said U-shaped pipe with reference to the substantially fixed level of the said shorter leg of the vent, said means being adapted for varying the low head of the siphon, determined by the height of the bend of the vent, to different levels below said sealing level of the siphon.

2. In a siphon of the class described including a vertical pipe forming the longer leg of the siphon and an inverted bell located over the upper end of said pipe and forming the shorter leg of the siphon, a vent adapted for determining both the sealing level and the low head of the siphon, said vent being located without the bell and embracing a U-shaped pipe having substantially upright legs, one of said legs being longer than the other, means connecting the longer leg of the vent with the interior of the bell, the upper end of the shorter leg of said vent being located substantially at the sealing level of the siphon, and means for adjusting the level of the bend of the U-shaped vent with reference to the substantially fixed level of the upper end of said shorter leg of said vent.

3. In a siphon of the class described including a vertical pipe forming the longer leg of the siphon and an inverted bell located over the upper end of said pipe and forming the shorter leg of the siphon, a vent adapted to determine both the sealing level and low head of the siphon, located without the bell and comprising two substantially upright pipes, one of said pipes being longer than the other, means connecting the longer pipe of the vent with the interior of the bell, means for supporting the shorter pipe of the vent with its upper end substantially at the sealing level of the siphon and a U-shaped pipe connecting the lower ends of said upright pipes of the vent, the legs of the U-shaped pipe having telescoping connection with said upright pipes.

In testimony, that I, SAMUEL F. MILLER, claim the foregoing as my sole invention I affix my signature in the presence of two witnesses, this sixteenth day of August, A. D. 1909.

SAMUEL F. MILLER.

Witnesses:
WALTER C. KANE,
E. M. FLUGGE.